United States Patent [19]
Strong

[11] Patent Number: 6,082,403
[45] Date of Patent: *Jul. 4, 2000

[54] POWER STEERING CONTROL VALVE WITH BACK PRESSURE

[75] Inventor: Daniel J. Strong, Clinton Township, Mich.

[73] Assignee: TRW Inc., Lyndhurst, Ohio

[*] Notice: This patent is subject to a terminal disclaimer.

[21] Appl. No.: 09/057,816

[22] Filed: Apr. 9, 1998

[51] Int. Cl.$^7$ .................................................. F15B 9/10
[52] U.S. Cl. ........................ 137/625.23; 91/375 A
[58] Field of Search ................ 91/375 A; 137/625.23

[56] References Cited

U.S. PATENT DOCUMENTS

| | | |
|---|---|---|
| 3,746,045 | 7/1973 | Bunker et al. . |
| 4,445,422 | 5/1984 | Bishop . |
| 4,461,321 | 7/1984 | Bacardit . |
| 4,577,660 | 3/1986 | Haga et al. . |
| 4,852,462 | 8/1989 | Uchida et al. . |
| 4,860,635 | 8/1989 | Uchida et al. . |
| 5,244,012 | 9/1993 | Tabata et al. . |
| 5,263,512 | 11/1993 | Emori et al. . |
| 5,417,244 | 5/1995 | Behrens et al. . |
| 5,458,153 | 10/1995 | Roeske . |
| 5,582,207 | 12/1996 | Gilbert et al. . |
| 5,794,507 | 8/1998 | Strong ........................ 137/625.23 X |

*Primary Examiner*—Gerald A. Michalsky
*Attorney, Agent, or Firm*—Tarolli, Sundheim, Covell, Tummino & Szabo L.L.P.

[57] ABSTRACT

A hydraulic fluid control valve (18) for a power steering gear (10) includes first and second relatively rotatable valve members (60, 62) which direct hydraulic fluid to flow between the valve members (60, 62) from inlet ports (70) to outlet ports (92). The valve members (60, 62) have radially opposed lands (71–79, 101–109) and grooves (81–89, 121–129) defining orifices (130) that enlarge and orifices (130) that constrict upon relative rotation of the valve members (60, 62) from neutral positions. A pair of the constricting orifices (130b, 130c) are located in parallel between the inlet ports (90) and the outlet ports (92). Each of those parallel constricting orifices (130b, 130c) is defined by a corresponding chamfered corner portion of a corresponding land (101, 102). The valve members (60, 62) provide back pressure at selected orifices between the outlet ports (92) and the inlet ports (90). The selected orifices at which back pressure is provided include only one (130c) of the pair of parallel constricting orifices (130b, 130c).

6 Claims, 5 Drawing Sheets

6,082,403

POWER STEERING CONTROL VALVE WITH BACK PRESSURE

TECHNICAL FIELD

The present invention relates to a hydraulic fluid control valve for a power steering gear.

BACKGROUND OF THE INVENTION

A known hydraulic fluid control valve for a power steering gear includes a valve core rotatable within a valve sleeve. The core and the sleeve control the pressure of hydraulic fluid flowing through the valve between a pump, a reservoir, and a pair of opposed fluid chambers on opposite sides of a piston in a hydraulic motor. When the core and the sleeve are in neutral positions, the hydraulic fluid pressures in the opposed fluid chambers are equal. When the core and the sleeve are rotated from the neutral positions, a plurality of lands and grooves on the core and the sleeve cooperate to increase the hydraulic fluid pressure in one of the opposed fluid chambers so as to provide hydraulic power steering assist in the steering gear.

SUMMARY OF THE INVENTION

In accordance with the present invention, an apparatus comprises first and second relatively rotatable valve members which direct hydraulic fluid to flow between the valve members from inlet ports to return ports. The valve members have radially opposed lands and grooves defining orifices that enlarge and orifices that constrict upon relative rotation of the valve members from neutral positions.

A pair of the constricting orifices are located in parallel between the inlet ports and the return ports. Each of those parallel constricting orifices is defined by a chamfered corner of a corresponding one of the lands. Additionally, the valve members comprise means for providing back pressure at only one of those parallel constricting orifices.

A hydraulic fluid control valve constructed in accordance with the present invention stabilizes the piston in an associated hydraulic motor, and further stabilizes the core and sleeve in the valve, by providing back pressure at constricting orifices that communicate with the fluid chamber at the low pressure side of the piston. This helps to improve steering "feel" and also to reduce noise.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
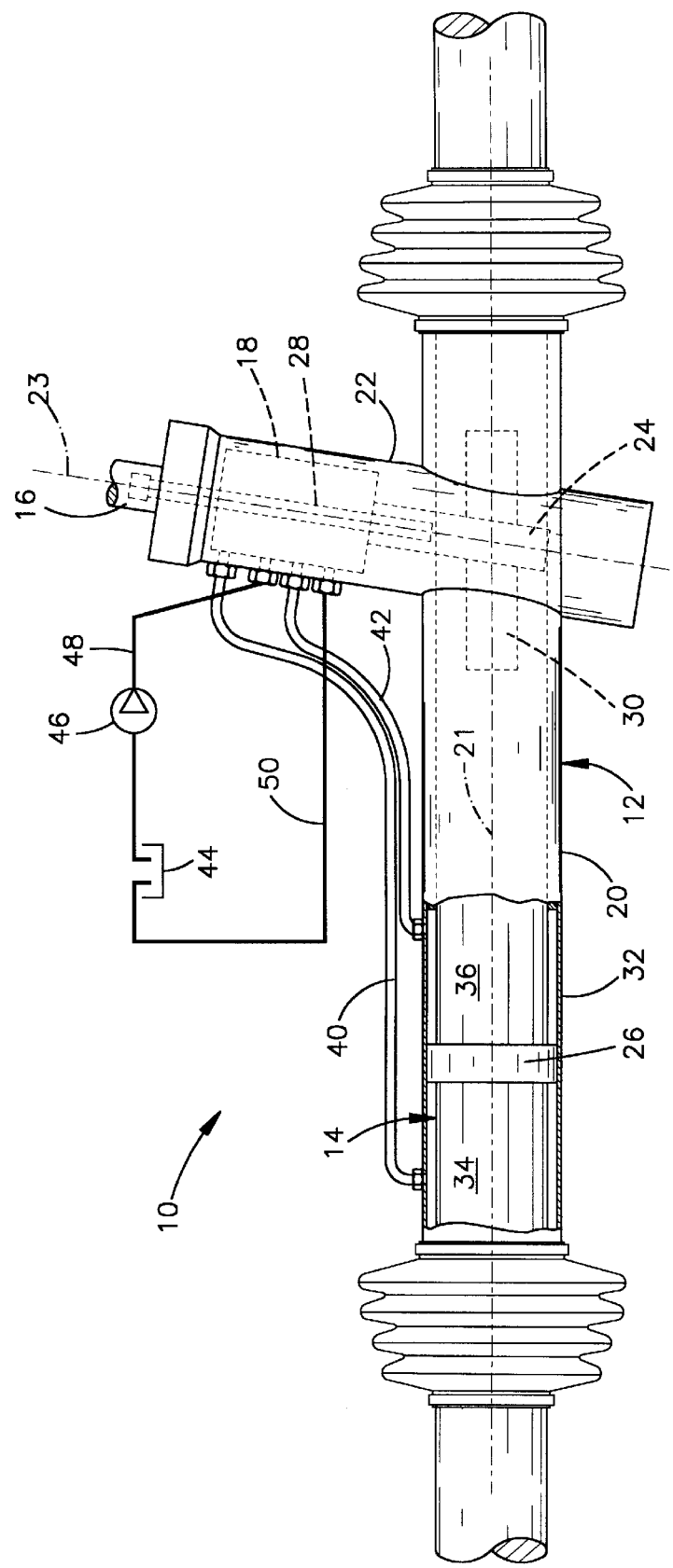
FIG. 1 is a view of an apparatus comprising a first embodiment of the present invention.

A hydraulic power steering gear 10 comprising a first embodiment of the present invention is shown in FIG. 1. The steering gear 10 is a hydraulically-assisted rack and pinion steering gear including a housing 12, a steering rack 14 and an input shaft 16. As shown schematically in FIG. 1, the steering gear 10 further includes a hydraulic fluid control valve 18 which is contained in the housing 12.

The rack 14 extends longitudinally through a lower portion 20 of the housing 12 along a horizontal axis 21, and is supported for movement relative to the housing 12 along the axis 21. When the steering gear 10 is installed in a vehicle, the opposite ends (not shown) of the rack 14 are connected to steering linkages which, in turn, connect the steering gear 10 to a pair of steerable vehicle wheels.

The input shaft 16 projects outward from an upper portion 22 of the housing 12 along another axis 23, and is rotatable about the axis 23 in response to rotation of the vehicle steering wheel. The steering gear 10 operates to move the rack 14 along the axis 21 in response to rotation of the input shaft about the axis 23. The steering gear 10 thus actuates the steering linkages to steer the vehicle wheels in response to rotation of the steering wheel.

Other parts of the steering gear 10 include a pinion gear 24 and a piston 26. The pinion gear 24 is connected with the input shaft 16 by a torsion bar 28, and is supported for rotation about the axis 23 in meshing engagement with a row of rack teeth 30 on the rack 14. A tubular section 32 of the lower housing portion 20 functions as a power cylinder. The piston 26 is fixed to the rack 14 within the power cylinder 32. A pair of variable volume hydraulic fluid chambers 34 and 36 are located in the power cylinder 32 on opposite sides of the piston 26.

The valve 18 communicates with the first chamber 34 in the power cylinder 32 through a first two-way conduit 40. The valve 18 communicates with the second chamber 36 in the power cylinder 32 through a second two-way conduit 42. As further shown schematically in FIG. 1, the valve 18 receives hydraulic fluid from a reservoir 44 and a pump 46 through an inlet conduit 48. The pump 46 could be a flow-varying pump, and could be driven by an electric motor or by the vehicle engine. An outlet conduit 50 exhausts hydraulic fluid from the valve 18 to the reservoir 44.

The valve 18 operates in response to rotation of the input shaft 16 with the vehicle steering wheel. When the input shaft 16 rotates with the steering wheel in a first direction about the axis 23, it rotates slightly relative to the pinion gear 24. The torsion bar 28 flexes to permit such rotation of the input shaft 16 relative to the pinion gear 24. The valve 18 responds to the resulting rotational displacement by opening hydraulic fluid flow paths that extend through the valve 18 from the inlet conduit 48 to the first two-way flow conduit 40. The valve 18 simultaneously closes hydraulic fluid flow paths that extend through the valve 18 from the second two-way flow conduit 42 to the outlet conduit 50. A resulting flow of hydraulic fluid from the pump 46, and a resulting hydraulic fluid pressure differential acting across the piston 26, cause the piston 26 and the rack 14 to move to the right, as viewed in FIG. 1, along the axis 21. This causes the steering linkage to steer the vehicle wheels in a first direction.

As the rack moves along the axis 21 with the piston 26, the pinion gear 24 rotates in meshing engagement with the rack teeth 30. The pinion gear 24 then rotates about the axis 23 relative to the input shaft 16 in a follow-up manner so as to cancel the rotational displacement between the pinion gear 24 and the input shaft 16. The valve 18 responds by closing the previously opened hydraulic fluid flow paths. This equalizes the hydraulic fluid pressures acting on the piston 26 in the two chambers 34 and 36 in the power cylinder 32, and causes the piston 26 and the rack 14 to stop moving along the axis 21.

When the vehicle wheels are to be steered in an opposite direction, the input shaft 16 is rotated with the steering wheel in an opposite direction about the axis 23, and is again rotated slightly relative to the pinion gear 24 upon flexing of the torsion bar 28. The valve 18 responds by pressurizing the second chamber 36 and by simultaneously exhausting the first chamber 34. The piston 26 and the rack 14 then move axially to the left, as viewed in FIG. 1. A resulting follow-up rotation of the pinion gear 24 relative to the input shaft 16 causes the valve 18 again to equalize the hydraulic fluid pressures in the two chambers 34 and 36 in the power cylinder 32.

Figure 2:
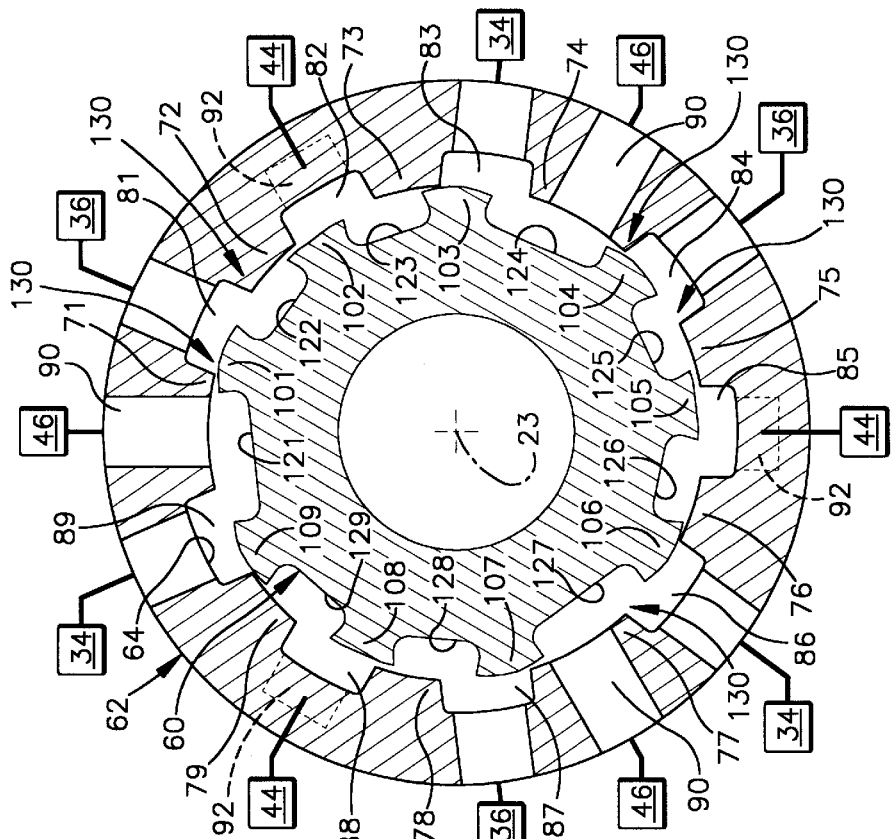
FIG. 2 is a view of parts of the apparatus of FIG. 1, with certain parts being shown in section and with other parts being shown schematically.

As shown in FIG. 2, the valve 18 includes a valve core 60 and a valve sleeve 62. Both the core 60 and the sleeve 62 have generally cylindrical shapes centered on the axis 23. The core 60 is defined by a section of the input shaft 16 (FIG. 1). The sleeve 62 is connected with an upper end portion of the pinion gear 24 (FIG. 1) Accordingly, the core 60 and the sleeve 62 rotate relative to each other when the input shaft 16 and the pinion gear 24 rotate relative to each other. As described in detail below, the core 60 and the sleeve 62 then vary the hydraulic fluid flow paths extending through the valve 18 so that certain flow paths become relatively unrestricted and certain flow paths become relatively restricted. Pressurized flows of hydraulic fluid are thereby directed through the valve 18 between the pump 46 and the fluid chambers 34 and 36 in the power cylinder 32, as described above with reference to FIG. 1.

The sleeve 62 has a radially inner periphery 64 extending circumferentially around the core 60. The inner periphery 64 of the sleeve 62 has an undulating contour defined by a plurality of circumferentially spaced lands and grooves specifically, the sleeve 62 has nine lands 71, 72, 73, 74, 75, 76, 77, 78 and 79 which are spaced apart circumferentially about the axis 23. The sleeve 62 further has nine grooves 81, 82, 83, 84, 85, 86, 87, 88 and 89, each of which is located circumferentially between a pair of adjacent lands.

Three inlet ports 90 extend radially inward through the sleeve 62 at the locations; of the first land 71, the fourth land 74, and the seventh land 77. As shown schematically in FIG. 2, the inlet ports 90 receive hydraulic fluid from the pump 46.

As further shown schematically in FIG. 2, some of the grooves in the sleeve 62 communicate with the fluid chambers 34 and 36 in the power cylinder 32 (FIG. 1), and some of the grooves communicate with the reservoir 44. Specifically, the first, fourth and seventh grooves 81, 84 and 87 communicate with the chamber 36 on the right side of the piston 26. The third, sixth and ninth grooves 83, 86 and 89 communicate with the other chamber 34 on the left side of the piston 26. The second, fifth and eight grooves 82, 85 and 88 communicate with the reservoir 44 through outlet ports 92 (shown schematically) at the ends of the grooves 82, 85 and 88.

The core 60 also has an undulating contour defined by circumferentially spaced lands and grooves. These include nine lands 101–109 and nine grooves 121–129. The lands 101–109 on the core 60 are located radially opposite the grooves 81–89 in the sleeve 62. The grooves 121–129 in the core 60 are located radially opposite the lands 71–79 on the sleeve 62. Accordingly, the adjacent corners of the lands 71–79 and 101–109 define eighteen orifices 130 between the grooves 81–89 and 121–129.

When a steering maneuver is not being performed, the core 60 and the sleeve 62 are located in neutral positions, as shown in FIG. 2. Hydraulic fluid then flows from the inlet ports 90 to the outlet ports 92 through the grooves 121–129, the orifices 130, and the grooves 81–89. This flow results from a pressure drop between the pump 46 and the reservoir 44. However, there is no pressure differential between the fluid chambers 34 and 36 in the power cylinder 32 when a steering maneuver is not being performed. Accordingly, there is no pressure differential between the set of grooves 81, 84 and 87 that communicate with the right chamber 36 and the other set of grooves 83, 86 and 89 that communicate with the left chamber 34.

Figure 3:
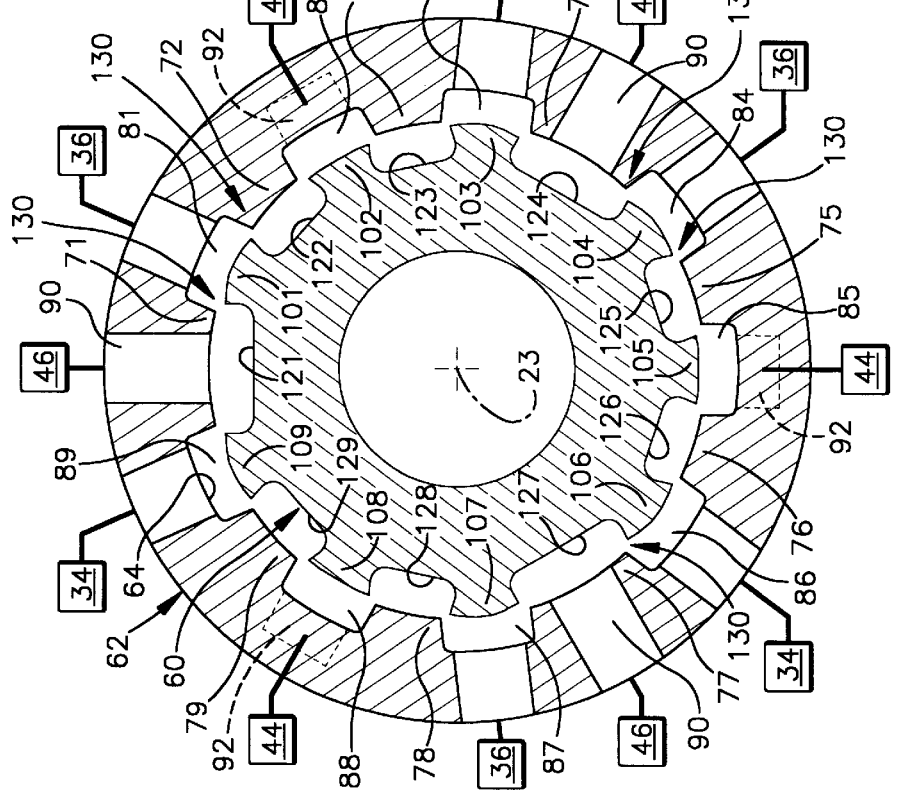
FIG. 3 is a view similar to FIG. 2 showing parts in different positions.

When the vehicle steering wheel and the input shaft 16 (FIG. 1) are turned to the left, the core 60 rotates relative to the sleeve 62 in a counterclockwise direction, as viewed in FIGS. 2 and 3. Nine of the eighteen orifices 130 are then enlarged, and the other nine orifices 130 are then constricted. This causes the hydraulic fluid pressure to increase in the set of grooves 83, 86 and 89 that communicate with the left chamber 34 in the power cylinder 32, and simultaneously causes the hydraulic fluid pressure to increase a lesser amount in the set of grooves, 31, 84 and 87 that communicate with the right chamber 36. In this manner, a small portion of the hydraulic fluid flow extending from the inlet ports 90 to the outlet ports 92 is diverted to the left chamber 34 through the grooves 83, 86 and 89. An equal flow of hydraulic fluid is simultaneously exhausted from the right chamber 36 to the corresponding grooves 81, 84 and 87. The piston 26 and the rack 14 then move to the right, as viewed in FIG. 1. This causes the steering linkages to turn the steerable vehicle wheels to the left.

Figure 4:
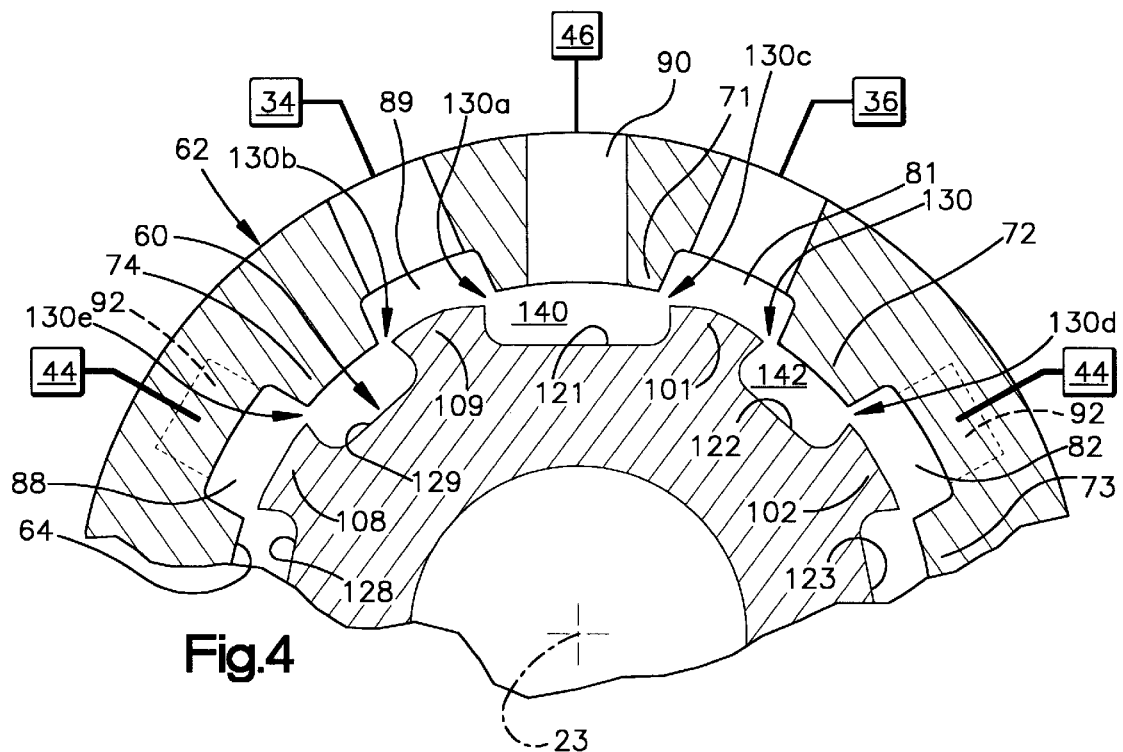
FIG. 4 is an enlarged partial view of parts shown in FIG. 2.

As shown in the enlarged view of FIG. 4, one of the orifices 130 that enlarges is differentiated from three of the orifices 130 that constrict upon rotation of the core 60 from the neutral position of FIG. 2 to the shifted position of FIG. 3. Specifically, one of the enlarging orifices 130 is designated by the reference number 130a in FIG. 4. An adjacent pair of constricting orifices 130 are designated by the reference numbers 130b and 130c. Those constricting orifices 130b and 130c define circumferentially opposite ends of a high pressure region 140 located within the valve 18 between the pump 46 and the left fluid chamber 34. Another constricting orifice 130 is designated br the reference number 130d. The constricting orifices 130d and 130c define circumferentially opposite ends of a low-pressure region 142 which is located within the valve 18 between the right fluid chamber 36 and the reservoir 44.

As described above, hydraulic fluid continuously flows between the core 60 and the sleeve 62 from the inlet ports 90 to the outlet ports 92. Accordingly, the constricting orifice 130d of FIG. 4 is located downstream of the constricting orifice 130c. The constricting orifice 130d thus provides back pressure at the constricting orifice 130c when the core 60 is rotating from the neutral position of FIG. 2 toward the shifted position of FIG. 3. However, there is no back pressure applied at the constricting orifice 130b at the circumferentially opposite end of the high pressure region 140. This is because the next adjacent downstream orifice 130e is enlarging rather than constricting. A stabilizing back pressure force is applied to the piston 26 in the low pressure fluid chamber 36 by applying back pressure to the flow at the constricting orifice 130c, while not applying back pressure to the flow at the constricting orifice 130b, in this manner. This results from the chamfered shapes of the corner portions of the lands 109, 101, and 102 beside the orifices 130b, 130c and 130d, respectively.

Figure 5:
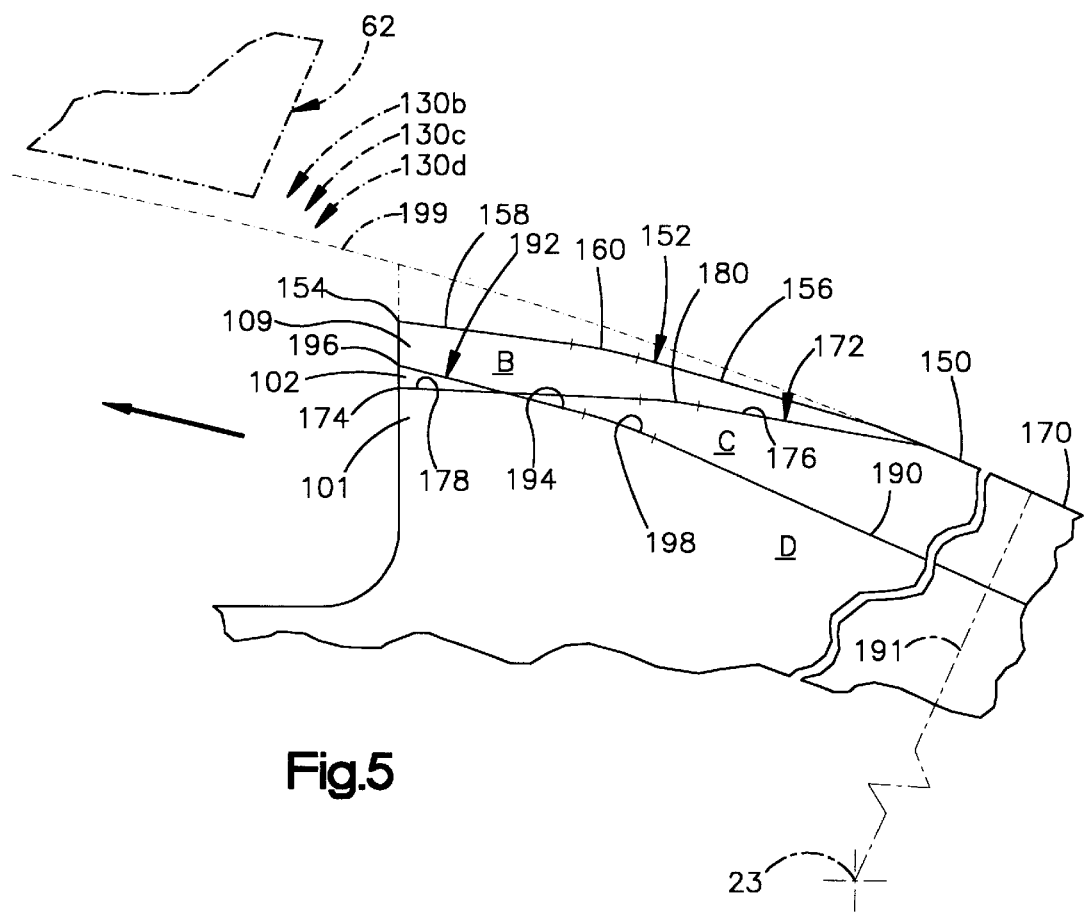
FIG. 5 is an enlarged view showing a superimposed relationship of parts shown in FIG. 4.

FIG. 5 shows the chamfered corner portions of the lands 109, 101 and 102 at the orifices 130b, 130c, and 130d, respectively, in a superimposed relationship of radial profiles for the purpose of comparison with each other. The land 109 has a cylindrical surface 150 with a circular radial profile centered on the axis 23 of rotation. The land 109 further has an edge surface 152 which is inclined radially inward from the cylindrical surface 150 to the adjacent corner 154 of the land 109. The edge surface 152 comprises a plurality of smaller surfaces having distinct radial profiles. These include a first planar facet 156, a second planar facet 158, and an arcuate intermediate surface 160. The first facet 156 extends from the cylindrical surface 150 to the intermediate surface 160. The second facet 158 is inclined radially inward relative to the first facet 156, and extends oppositely from the corner 154 to the intermediate surface 160. The intermediate surface 160 is tangent to each of the facets 156 and 158.

The land 101 has a cylindrical surface 170 concentric with the cylindrical surface 15C, of the land 109. The land 101 also has an edge surface 172 which is tapered radially inward from the cylindrical surface 170 to the adjacent corner 174 of the land 101. The edge surface 172 comprises a first planar face 176, a second planar facet 178, and an arcuate intermediate surface 180, each of which also has a distinct radial profile.

As compared with the first facet 156 at the edge surface 152, the first facet 176 at the edge surface 172 intersects the corresponding cylindrical surface 170 at a location that is spaced circumferentially farther away from the corresponding corner 174. The facet 176 is also inclined and spaced radially inward more than the facet 156. The second facet 178 at the edge surface 172 has a lesser angle of radially inward inclination, as compared with the second facet 158 at the edge surface 152. However, the second facet 178 is larger and is spaced radially inward more than the second facet 158. The intermediate surface 180 is smaller than the intermediate surface 160, but also is tangentially intersected by the corresponding facets 176 and 173.

The land 102 does not have a cylindrical surface like the cylindrical surfaces 150 and 170 at the lands 109 and 101. Instead, the land 102 has a large planar facet 190 extending fully between its chamfered opposite corner portions. The facet 190 is perpendicular to a centerline 191 of the land 102 extending diametrically through the axis 23. The edge surface 192 at the chamfered corner portion of the land 102 that is shown in FIG. 5 has a single planar facet 194 extending from the corresponding corner 196 toward the facet 190. The edge surface 192 further has an arcuate end section 19 8 which is tangentially intersected by the facets 190 and 194. The corner 196 of the land 102 is located radially between the corners 154 and 174 of the lands 109 and 101. The facet 194 extends radially inward across the facet 178, as vie wed in FIG. 5, and the facet 190 is inclined and spaced radially inward from each of the other facets 156, 158, 176, 178 and 194.

When the core rotates relative to the sleeve 62 to the left, as viewed in FIG. 5, the orifice s 130b, 130c and 130d become constricted in the manner described above with reference to FIGS. 3 and 4. Specifically, the orifices 130b, 130c and 130d initially constrict as the corners 154, 174 and 196 of the lands 109, 101 and 102 move toward the opposed corners on the sleeve 62 in directions extending from right to left in FIG. 5. Also shown in FIG. 5 is a circular line 199 which is concentric with the cylindrical surfaces 150 and 170. Since the corners 154, 174 and 196 are all spaced radially inward from the circular line 199, none of the orifices 130b, 130c and 130d becomes fully constricted when the corresponding corner 154, 174 or 196 moves beside the opposed corner on the sleeve 62. Instead, each of those orifices 130b, 130c, and 130d continues to constrict as the corresponding edge surface 152, 172 or 192 moves past the opposed corner on the sleeve 62.

When the orifice 130d constricts in the foregoing manner, it applies back pressure to the flow of hydraulic fluid then passing through the orifice 130c, as described above with reference to FIG. 4. The flow of hydraulic fluid then passing through the orifice 130b continues without such an application of back pressure, also as described above with reference to FIG. 4.

The orifice 130b subsequently becomes fully constricted when the cylindrical surface 150 reaches and moves beside the opposed corner on the sleeve 62. The orifice 130c becomes fully and equally constricted when the concentric cylindrical surface 170 reaches and moves beside the corresponding corner on the sleeve 62. However, the orifice 130d becomes fully constricted at a substantially earlier time when the facet 190 reaches and moves beside the corresponding corner on the sleeve 62, and has a fully constricted size which is much larger than the fully constricted sizes of the orifices 130b and 130c. This ensures that the back pressure provided by constriction of the orifice 130d does not exceed a predetermined level.

Figure 6:
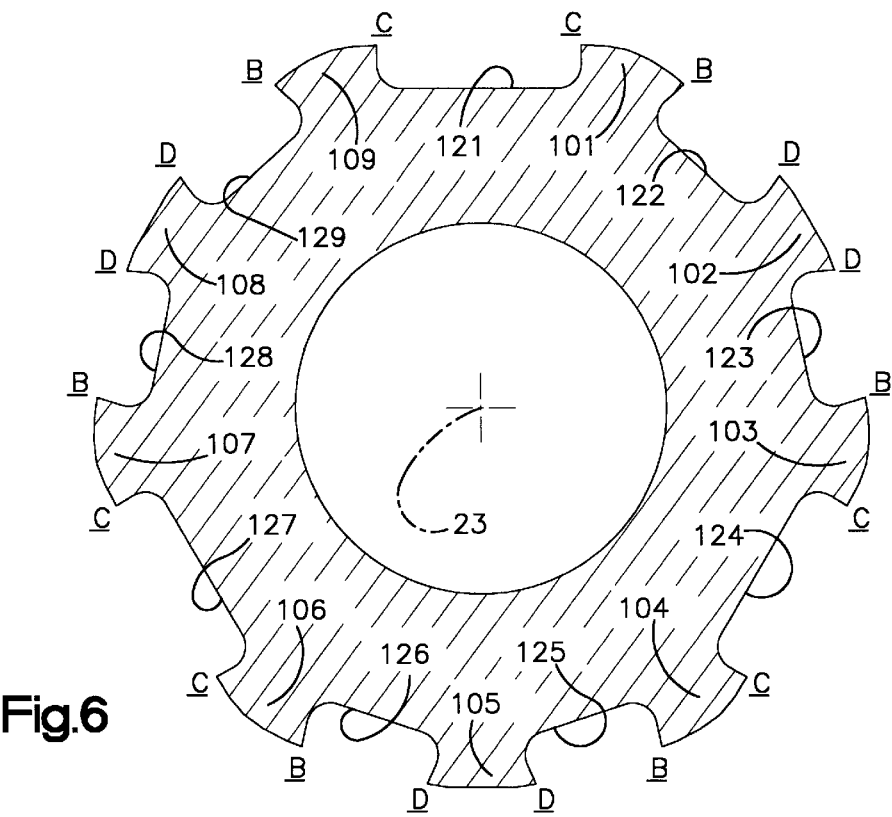
FIG. 6 is a view of a part shown fully in FIGS. 2 and 3.

As further shown in FIG. 5, the chamfered corner contour of the land 109 beside the orifice 130b is designated by the letter B. The chamfered corner contour of the land 101 beside the orifice 130c is designated by the letter C. The chamfered contour of the land 102 beside the orifice 130d is similarly designated by the letter D. FIG. 6 shows the preferred locations where the B, C, and D contours are repeated about the circumference of the core 60. Although the B and C contours are preferably different from each other, as shown in FIG. 5, they could alternatively be the same as each other.

In the arrangement of FIG. 6, any pair of constricting orifices at opposite ends of a high-pressure region between the core 60 and the sleeve 62 will have back pressure applied at one of the orifices in the pair, but not at the other, in accordance with the present invention. The back pressure will be applied by the next constricting orifice located downstream from the orifice receiving back pressure. In other words, whenever a pair of corners having the B and C contours define opposite ends of a high pressure region like the high pressure region 140 of FIG. 4, the constricting orifice at the corner having the C contour will be subjected to back pressure from the orifice at the next adjacent downstream corner having the D contour. The opposite effect will be provided when the core 60 is rotated in the opposite direction.

Figure 7:
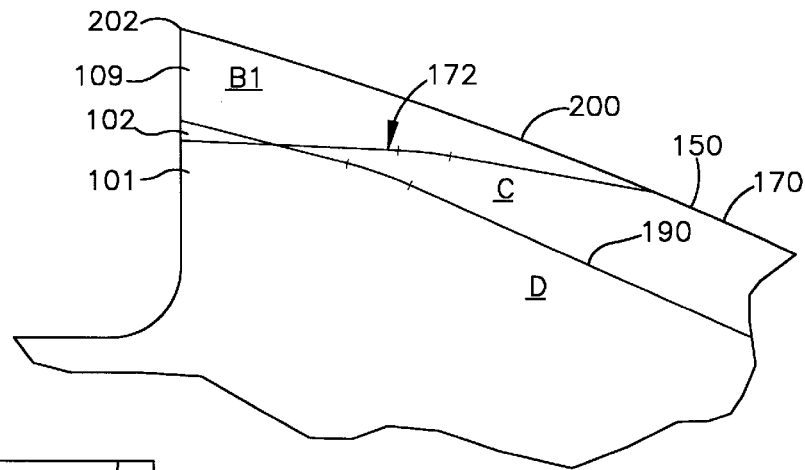
FIG. 7 is a view similar to FIG. 5 showing parts of an apparatus comprising a second embodiment of the present invention.
Figure 8:
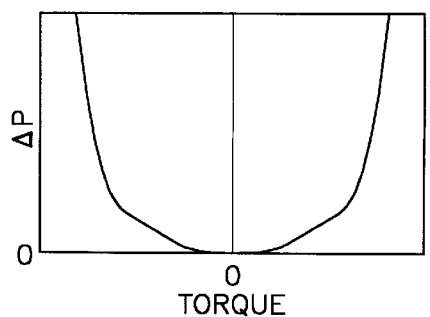
FIG. 8 is a graph showing performance characteristics of the apparatus of FIG. 7.

A second embodiment of the present invention is shown partially in FIG. 7. In the second embodiment, the land 109 of FIG. 5 has an alternative contour designated B1. Unlike the B contour of FIG. 5, the B1 contour of FIG. 7 is not chamfered. The 21 contour is instead defined by a cylindrical surface 200 of the land 109 which extends fully to the corner 202 of the land 109. Unlike the orifice 130b of FIG. 5, an orifice beside the B1 contour of FIG. 7 will become fully constricted when the corner 202 and the cylindrical surface 200 together move beside and past an opposed corner on the sleeve 62. Accordingly, such an orifice will become fully constricted at a relatively earlier time. This feature of the present invention enables the valve 18 to provide a linear relationship between the torque in the input shaft 16 (FIG. 1) and the pressure differential acting across the piston 26, if such a linear relationship is desired, as shown in FIG. 8.

Figure 9:
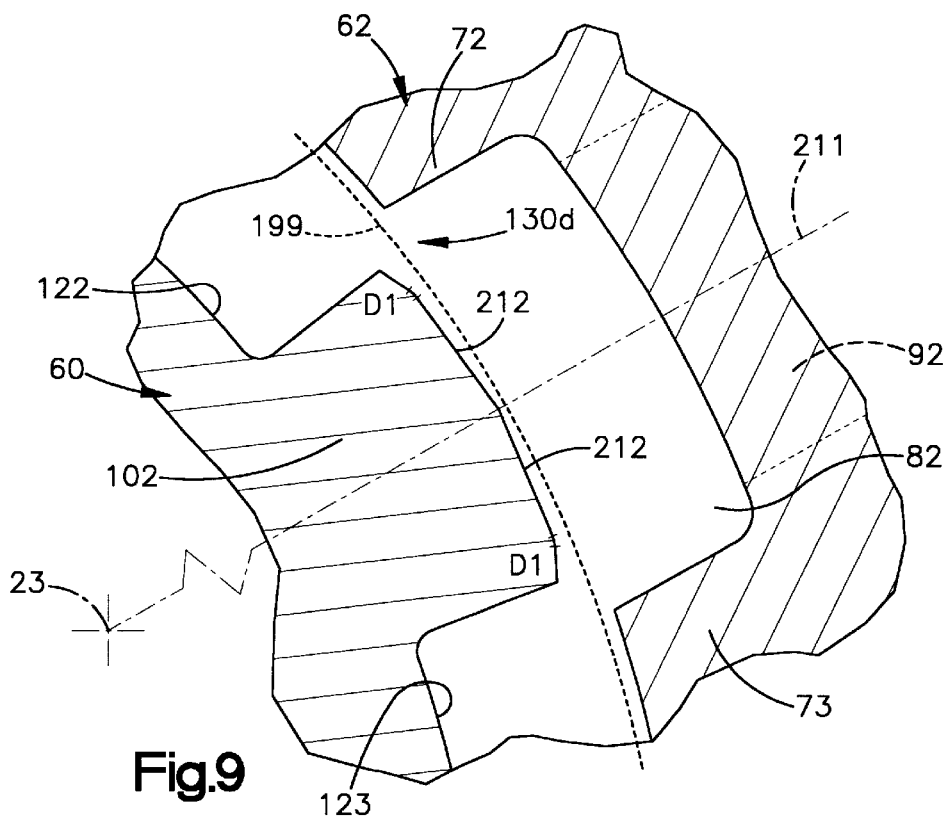
FIG. 9 is a view similar to FIG. 4 showing parts of an apparatus comprising a third embodiment of the present invention.

A third embodiment of the present invention is shown partially in FIG. 9. In the third embodiment, the land 102 of FIG. 4 has an alternative configuration. Specifically, the land 102 in the third embodiment has a centerline 211 intersecting the axis 23, and is symmetrical about the centerline 211, but has a pair of chamfered opposite corner portions with alternative contours D1.

The land 102 of FIG. 9 has a pair of large planar facets 212 extending from the opposite corner portions to the centerline 211. Also shown in FIG. 9 is the circular line 199 of FIG. 5. Like the planar facet 190 on the land 102 of FIG. 5, each of the planar facets 212 on the alternative land 102 of FIG. 9 is entirely spaced radially inward from the circular line 199. This ensures that each of the planar facets 212 will define fully a constricted size for its corresponding orifice that is substantially larger than the fully constricted sizes of an associated pair of parallel constricting orifices in the same manner as described above with reference to the orifices shown in FIG. 5. However, unlike the planar facet 190 of FIG. 5, the planar facets 212 of FIG. 9 are inclined relative to the corresponding centerline 211. The alternative land 102 thus has a crown-shaped radial cross-section. A lesser amount of metal material needs to be cut away from the original outer diameter of the core 60 upon formation of the crown-shaped land 102 of FIG. 9, as compared with the amount of metal material that must be cut away to form the more fully flattened land 102 of FIGS. 4 and 5.

Figure 10:
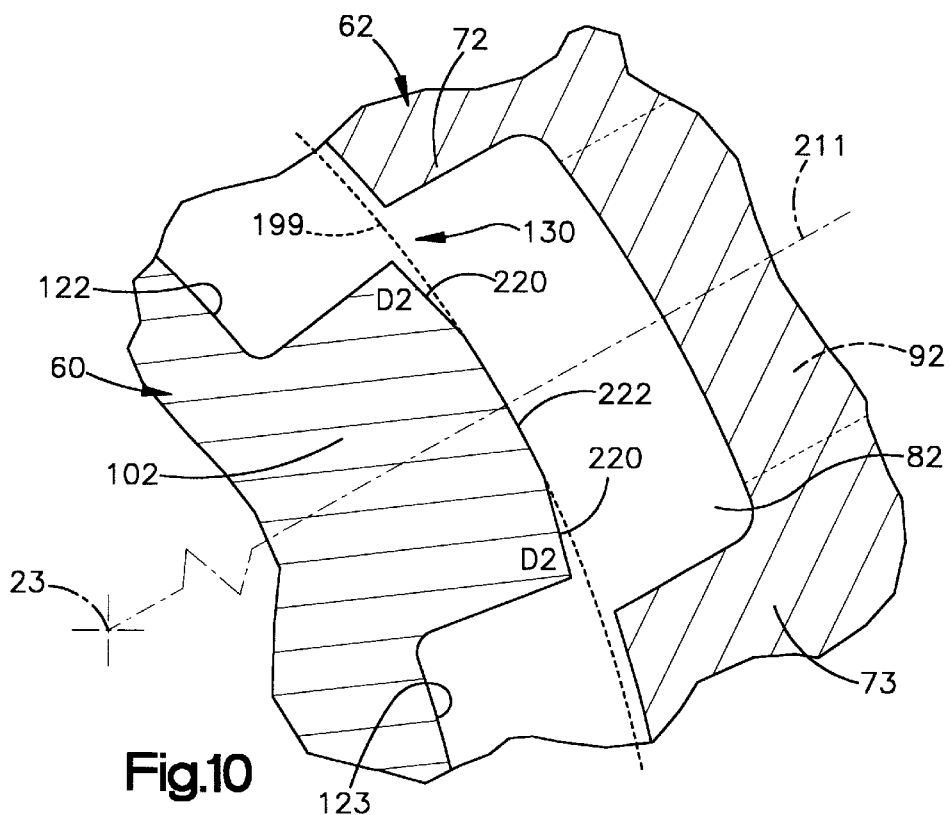
FIG. 10 is a view similar to FIG. 9 showing parts of an apparatus comprising a fourth embodiment of the present invention.

A fourth embodiment of the present invention is shown partially in FIG. 10. In the fourth embodiment, the land 102 has an alternative crown-shaped cross-section which differs somewhat from the crown-shaped cross-section shown in FIG. 9.

The land 102 of FIG. 10 also is symmetrical about the centerline 211, and has a pair of chamfered opposite corner portions with alternative contours D2. Each of the D2 contours is defined by a single planar facet 220. A cylindrical outer surface 222 of the land 102 extends fully between the planar facets 220 along the circular line 199. In accordance with the present invention, each of these planar facets 220 remains spaced radially inward from the circular line 199 throughout the entire range of rotation of the core 60 about the axis 23. This ensures that the orifices defined by the planar facets 220 have fully constricted sizes that are larger than the fully constricted sizes defined by cylindrical surfaces extending along the circular line 199. However, unlike the planar facets 212 of FIG. 9, the planar facets 220 of FIG. 10 are not entirely spaced radially inward from the circular line 199. Instead, each planar facet 220 intersects the circular line 199 at a location spaced from the centerline 211.

From the above description of the invention, those skilled in the art will perceive improvements, changes and modifications. For example, the present invention is equally applicable to a relatively rotatable valve part having more or less than nine lands and grooves. Such improvements, changes and modifications within the skill of the art are intended to be covered by the appended claims.

Having described the invention, the following is claimed:

1. Apparatus comprising:

first and second relatively rotatable valve members having a common axis, said valve members being configured to direct hydraulic fluid to flow between said valve members from inlet ports to outlet ports;

said valve members having radially opposed lands and grooves defining orifices that enlarge and orifices that constrict upon relative rotation of said valve members from neutral positions;

a pair of said constricting orifices being located in parallel between said inlet ports and said outlet ports, said pair of parallel constricting orifices having fully constricted sizes defined by a pair of concentric cylindrical surfaces on a corresponding pair of lands;

said valve members comprising means for providing back pressure at selected orifices between said outlet ports and said inlet ports, Said selected orifices including only one of said pair of parallel constricting orifices;

said means for providing back pressure comprising a third land which is spaced from said pair of lands, said third land defining a third orifice located in series with said one of said pair of parallel constricting orifices;

said third orifice having a fully constricted size defined by a surface portion of said third land which is spaced radially inward from said concentric cylindrical surfaces, whereby said fully constricted size of said third orifice is greater than said fully constricted sizes of said pair of parallel constricting orifices;

said third land having a centerline intersecting said axis, said surface portion of said third land having a radial profile inclined relative to said centerline.

2. Apparatus as defined in claim 1 wherein said third land is symmetrical about said centerline.

3. Apparatus as defined in claim 1 wherein said surface portion of said third land is a portion of a planar surface that is entirely spaced radially inward from said concentric cylindrical surfaces.

4. Apparatus as defined in claim 3 wherein said concentric cylindrical surfaces have radial profiles that extend along a circular line centered on said axis, said surface portion of said third land being a portion of a planar surface having a radial profile that intersects said centerline at a location spaced radially from said circular line.

5. Apparatus comprising:

first and second relatively rotatable valve members having a common axis, said valve members being configured to direct hydraulic fluid to flow between said valve members from inlet ports to outlet ports;

said valve members having radially opposed lands and grooves defining orifices that enlarge and orifices that constrict upon relative rotation of said valve members from neutral positions;

a pair of said constricting orifices being located in parallel between said inlet ports and said outlet ports, said pair of parallel constricting orifices having fully constricted sizes defined by a pair of concentric cylindrical surfaces on a corresponding pair of lands;

said valve members comprising means for providing back pressure at selected orifices between said outlet ports and said inlet ports, said selected orifices including only one of said pair of parallel constricting orifices;

said means for providing back pressure comprising a third land which is spaced from said pair of lands, said third land defining a third orifice located in series with said one of said pair of parallel constricting orifices;

said third orifice having a fully constricted size defined by a surface portion of said third land which is spaced radially inward from said concentric cylindrical surfaces, whereby said fully constricted size of said third orifice is greater than said fully constricted sizes of said pair of parallel constricting orifices;

said third land having a centerline intersecting said axis, said surface portion of said third land having a radial profile inclined relative to said centerline;

said surface portion of said third land is a portion of a planar surface that is not entirely spaced radially inward from said concentric cylindrical surfaces.

6. Apparatus as defined in claim 5 wherein said concentric cylinder surfaces have radial profiles that extend along a circular line centered on said axis, said surface portion of said third land being a portion of a planar surface having a radial profile that intersects said circular line at a location from said centerline.

* * * * *